United States Patent
Dockal-Baur et al.

(10) Patent No.: US 6,391,151 B2
(45) Date of Patent: May 21, 2002

(54) PROCESS FOR DISSOLVING USED PAPER

(75) Inventors: Jürgen Dockal-Baur, Fronreute; Axel Gommel, Ravensburg; Wolfgang Müller, Weingarten; Harald Selder, Schlier; Andreas Steidele, Ravensburg, all of (DE); Klaus Steinbild, Appleton, WI (US)

(73) Assignee: Voith Paper Patent GmbH, Ravensburg (DE)

(*) Notice: Subject to any disclaimer, the term of this patent is extended or adjusted under 35 U.S.C. 154(b) by 0 days.

(21) Appl. No.: 09/753,572

(22) Filed: Jan. 4, 2001

(30) Foreign Application Priority Data

Jan. 5, 2000 (DE) .......................... 100 00 181

(51) Int. Cl.⁷ .............................. D21B 1/32
(52) U.S. Cl. ................... 162/4; 162/4; 162/55; 162/56
(58) Field of Search ................. 162/4, 5, 55, 56

(56) References Cited

U.S. PATENT DOCUMENTS

| 5,518,580 A | * | 5/1996 | Ortner et al. ............. 162/4 |
| 5,958,179 A | * | 9/1999 | Gehr et al. ............... 162/6 |
| 6,000,640 A | | 12/1999 | Krebs et al. ........... 241/24.29 |

FOREIGN PATENT DOCUMENTS

| DE | 3439098 | 3/1986 |
| DE | 19736143 | 2/1999 |
| DE | 19753202 | 6/1999 |

* cited by examiner

Primary Examiner—Dean T. Nguyen
(74) Attorney, Agent, or Firm—Greenblum & Bernstein, P.L.C.

(57) ABSTRACT

Process for dissolving used paper including adjusting a content of solid particles of used paper to a range between about 15 and 35%, kneading the used paper with a specific work of at least about 10 kWh/t, diluting the kneaded used paper to a content of solid particles below about 6%, separating non-fibrous contaminants with wet screening, adjusting a solid material content to less than about 3%, and separating heavy particles with at least one hydrocyclone.

38 Claims, 2 Drawing Sheets

PROCESS FOR DISSOLVING USED PAPER

CROSS-REFERENCE TO RELATED APPLICATIONS

The present application claims priority under 35 U.S.C. § 119 of German Patent Application No. 100 00 181.5, filed on Jan. 5, 2000, the disclosure of which is expressly incorporated by reference herein in its entirety.

BACKGROUND OF THE INVENTION

1. Field of the Invention

The present invention is directed to a process for dissolving used paper.

2. Discussion of Background Information

It is known that processes of the above-mentioned type are performed in such a way that the used paper is supplied to a pulper in the state in which it was delivered to the paper factory. Here, this pulper serves to mix in water and to dissolve the paper webs. If necessary, a station for removing bale wires or bale edges can be provided before the pulper. As a rule, all components of the used paper bale, possibly without these wires or edges, are dropped into the pulper and are mechanically processed with more or less intensity. Besides the high energy consumption in the pulper, another undesired result of the known process can be a breaking down of non-fibrous attendant materials to the extent that it becomes difficult to remove these particles. The large amount of such foreign materials arriving in the suspension necessitates a high sorting and cleaning expenditure.

DE 34 39 098 A1 discloses, e.g., a process in which, before the dissolution in the pulper, several grinding and cleaning steps are performed on the used paper, which is not yet in a suspension. While this process is good and effective, it is also expensive.

A system is known, e.g., from DE 197 53 202 A1, that is used to process packaging waste. The purpose of this process is to attain plastics that are sorted by type. In this process, a type of used paper occurs as well, which exists as air-dry pieces or scraps of paper and already has a certain degree of purity; however, it is not free of impurities, in particular adhering plastic films, for example, of beverage cartons.

SUMMARY OF THE INVENTION

The present invention provides a process with which it is possible to process the waste paper into a paper fiber suspension continually and in as economical a manner as possible, preferably in such a way that the conventional used paper pulper and an expensive coarse sorting can be eliminated.

According to the invention, the process for dissolving used paper includes adjustment of the content of solid particles of the used paper, e.g., by the introduction of water, to a range between about 15 and 35%, kneading with a specific work of at least about 10 kWh/t, subsequent dilution to a content of solid particles below about 6%, subsequent separation of non-fibrous contaminants, e.g., plastic films, with the aid of a wet screening, subsequent adjustment to a solid material content of less than about 3%, and preferably less than about 2%, and subsequent separation of heavy particles with the aid of hydrocyclones.

Therefore, in this process of the instant invention, delivered used paper is used as a raw material which, at the beginning of processing, is in pieces (paper scraps) due to breaking up of the paper webs, and, instead of being sent to a pulper, is sent directly to a used paper kneading device. At the water content provided, this device is in a position to perform a function that would otherwise be possible in a pulper. It is favorable for such kneading devices to be able to be operated continuously. However, pulpers that can be used for such raw materials are ideally operated in batches. This is especially true for high-consistency pulpers in the consistency range of about 8 to 15%.

The dissolving effect can be increased by heating the used paper. However, this temperature must be adjusted to impurities still present in the used paper in order to prevent undesired grinding of soft, non-fibrous impurities. In such raw materials, plastic coatings are often present on the paper webs that are relatively thin and easily torn, even if not as easily as paper webs that have been swollen by water. It is precisely these impurities that can be removed in a particularly effective and economical fashion in the subsequent mid-consistency sorting. In special cases, a thin stock sorting can occur instead of the mid-consistency sorting, which leads to greater success, but also to a higher expenditure. The impurities that are very small and have not yet been removed, in particular, small, heavy particles, can be removed in the subsequent hydrocyclone treatment, for which purpose highly effective cleaners are particularly well-suited.

Accordingly, the instant invention is directed to a process for dissolving used paper including adjusting a content of solid particles of used paper to a range between about 15 and 35%, kneading the used paper with a specific work of at least about 10 kWh/t, diluting the kneaded used paper to a content of solid particles below about 6%, separating non-fibrous contaminants with wet screening, adjusting a solid material content to less than about 3%, and separating heavy particles with at least one hydrocyclone.

In accordance with a feature of the invention, the content of solid particles of used paper can be adjusted by introducing water, non-fibrous contaminants may include plastic films, and the solid material content can be adjusted to less than about 2%.

According to another feature of the instant invention, the wet screening may be performed at a consistency of between about 2 and 5%.

Further, the wet screening may be performed in a wet screener with round screen openings having a diameter of about 1–3 mm. The wet screener may remove at least about 80% of the non-fibrous contaminants contained in the used paper during kneading. The non-fibrous contaminants may include plastic film.

According to still another feature of the present invention, the wet screening may be performed in at least one pressure sorter.

In accordance with a further feature, a temperature of the used paper during kneading can exceed 80° C.

According to a still further feature of the present invention, the content of solid particles of used paper before kneading can be adjusted by being sprayed with water.

Moreover, the kneading can occur in a single-wall shredder. The single-wall shredder may include kneading tools moved relative to one another at a speed of no greater than about 15 m/sec and at a distance from one another of at least about 10 mm.

Further still, the kneading may occur in a double-wall shredder. The kneading may be performed for at least about 2 minutes.

According to another feature of the instant invention, the kneading may be performed in a disk disperser having rows of teeth that engage one another.

Further, the kneading may be performed in a rotating drum including at least one moving grinding element. A radial extension of the grinding element can be at least about 10% of a diameter of the rotating drum.

The kneading may be performed in a rotating drum including a fixed displacer that forms a kneading zone between the fixed displacer and the rotating drum.

In accordance with still another feature of the invention, the kneading may be performed continuously. The process can also include adjusting and regulating an intensity of the kneading according to at least one quality value of the used paper determined after kneading. The at least one quality value may include whiteness achieved in a subsequent deinking.

The process may also include breaking up the used paper that is not suspended up before kneading to such an extent that a majority of the webs or sheets have been torn up several times. The process can also include removing coarse impurities from the used paper before kneading. The coarse impurities may include coarse heavy portions. Further, the process can include removing iron pieces before kneading with a magnetic separator. The process may also include removing bale binding wires before kneading.

According to still another feature of the instant invention, the process may include removing heavy particles from the suspension with cleaners whose field of force is more than 500 times the acceleration due to gravity.

The process can also include removing, in a deinking arrangement, fine impurities from the kneaded and suspended used paper. The fine impurities can include printing inks. The deinking arrangement may be connected downstream of the hydrocyclones.

In accordance with another feature of the invention, no pulper is used in the process, and no dissolving drum with a pure falling effect is used.

Moreover, no sorting is performed at consistencies less than about 2%, and no hydrocyclones are used at consistencies greater than about 2%.

According to a further feature of the present invention, the process may be performed continuously.

In accordance with a still further feature of the invention, the amount of water added can be adjusted in accordance with an amount of used paper to be dissolved.

In accordance with a further feature of the present invention, the amount of water added may be adjusted in accordance with a power consumption for kneading, thereby regulating the power consumption.

According to yet another feature of the present invention, the amount of water added can be adjusted to a power consumption for kneading and to an amount of used paper, thereby regulating the specific work of the kneading.

The present invention is directed to a process for dissolving used paper that includes kneading used paper having a solid particle content of between about 15 and 35% with a specific work of at least about 10 kWh/t, diluting the kneaded used paper to a content of solid particles below about 6%, separating non-fibrous contaminants in the diluted kneaded used paper with wet screening, adjusting a solid material content of the wet screened used paper to less than about 3%, and separating heavy particles from the wet screened used paper after the solid material content has been adjusted with at least one hydrocyclone.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
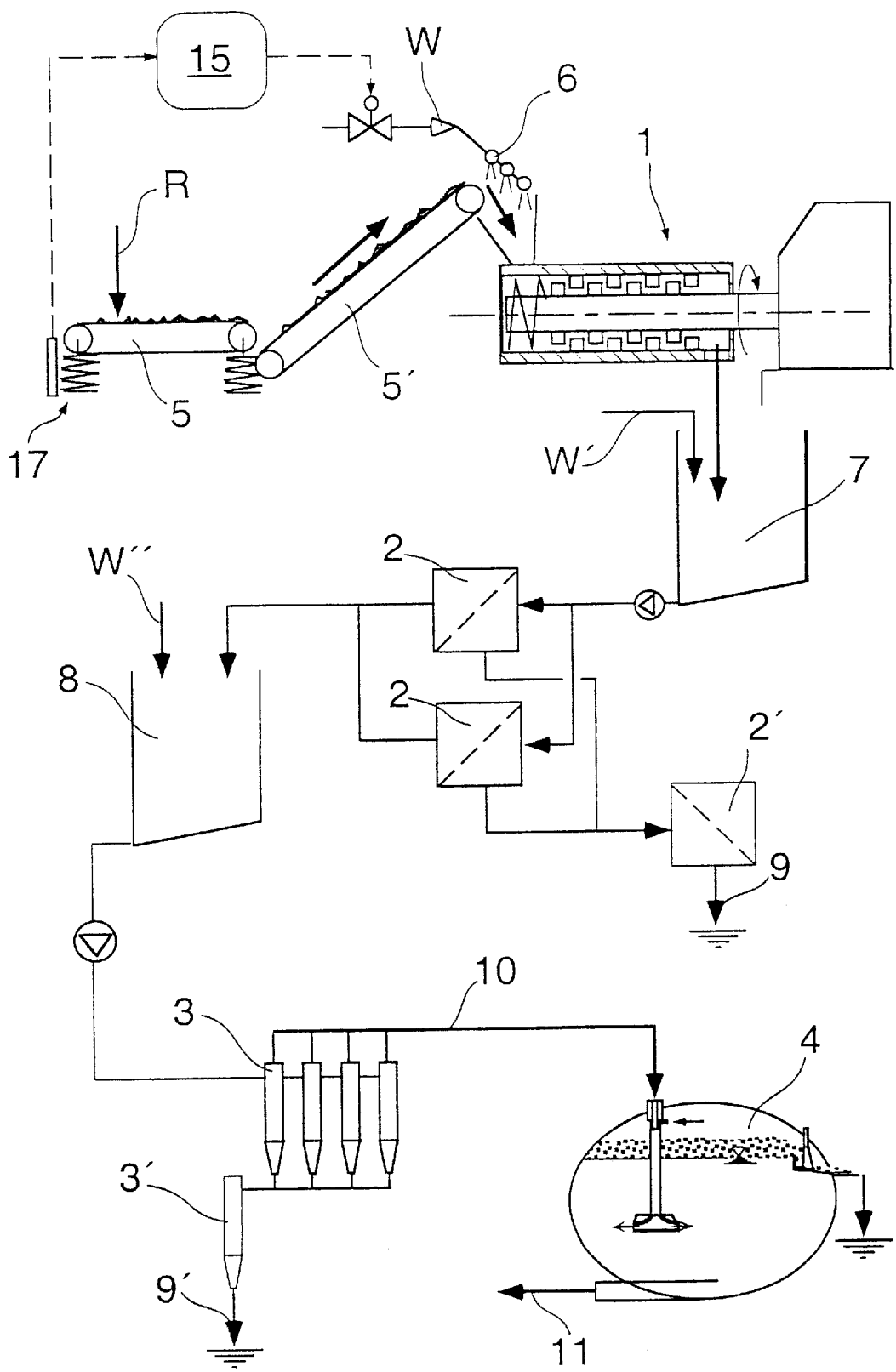
FIG. 1 illustrates a simplified plant layout appropriate for performing the process according to the invention.

In the plant schematically shown in FIG. 1, used paper R falls in a loose pour onto a conveyor belt 5 in pieces such as, e.g., those that result from shredding used paper. Conveyor belt 5 can be provided with a weighing device 17 for determining the amount of used paper R delivered. At the end of first conveyor belt 5, a second conveyor belt 5' is arranged to bring the used paper to the necessary geodetic height. Such distribution and supply devices are known and therefore only implied here, and their use depends upon the spacial conditions and on the extent to which delivered used paper R has been loosened. Without first being dissolved, i.e., brought into a suspension, used paper raw material R is introduced into a single-wall shredder 1 and is then sprayed with a necessary amount of water W via spraying pipes 6. Water can also be introduced directly into kneader 1 (see, e.g., FIG. 4). It is advantageous for the amount of water to be adjusted to the amount of used paper R detected by weighing device 17 by a regulator 15. While single-wall shredders 1 and double-wall shredders are apparatuses that are well-suited for performing the kneading, other suitable devices can also be utilized. In this regard, in contrast to the pulper, the shearing force in such kneading apparatuses can be transferred in the desired amount evenly onto all parts of the stock, which serves to conserve energy and is important in the case of sensitive foreign matter (e.g., films, stickies) and in separating the printing ink particles from the fibers. The latter process, in preparation for a later deinking, is of particular significance in the case of the used paper raw materials R considered here.

After the mechanical processing of used paper R, it falls into a dilution vat 7. Water W' is added for creating a suspension with the consistency that is suitable for the subsequent sorting out of non-fibrous foreign materials. This sorting is performed with the aid of a wet screening which, in the exemplary embodiment, is multi-stage. In this manner, the overflow of both pressure sorters 2 shown in an exemplary fashion is combined and guided to another pressure sorter 2', which forms rejects 9. Such connections are known to those ordinarily skilled in the art. The sorting performed at this point allows the possibility of separating a large portion of the impurities present in used paper R, e.g., plastic films, into rejects 9. The cycle of pressure sorter 2 discharges into a vat 8, in which water W" is added in order to further reduce the consistency. The removal of smaller heavy particles can then occur in a battery of cleaners 3, which can also be multi-stage. The overflow of cleaners 3 goes to secondary cleaners 3' for forming rejects 9'. Here, accepted stock 10 of cleaners 3 is fed into a deinking arrangement 4 in which fine foreign materials are removed, e.g., in a known manner using flotation. Arrangement 4 can also be multi-stage. Accepted stock 11 attained in this manner is of an excellent quality with respect to its degree of dissolution and purity such that it can be used for paper production.

Figure 2:
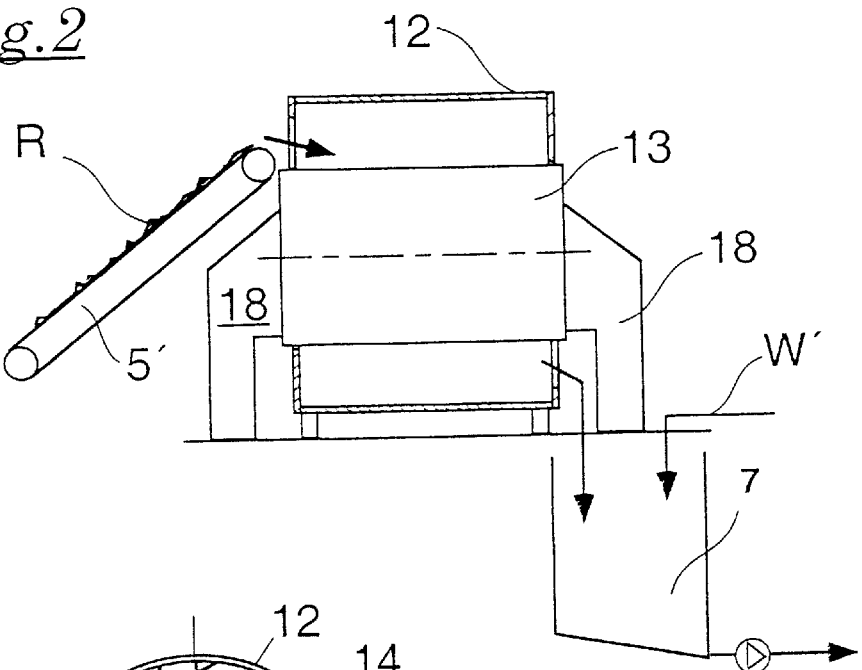
FIG. 2 illustrates a variant with a drum for kneading.

FIG. 2 illustrates another device for performing the kneading, i.e., a rotating dissolving drum 12 in which the wetted used paper stock placed therein, with the aid of a fixed displacer 13, is subjected to the kneading necessary for performing the process. Displacer 13 is held in place from outside by two stands 18. A kneading zone 14 with intensive friction and shear forms between displacer 13 and dissolving drum 12. Kneading work can also be transferred to other parts of the interior of the drum. Such a device or a similar device is known, e.g., from German Patent Application No. P 197 36 143.

Figure 3:
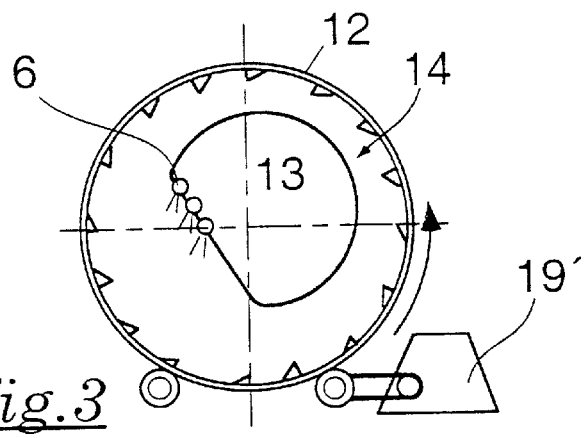
FIG. 3 illustrates another view of the drum as depicted in FIG. 2.

FIG. 3 illustrates the above-mentioned dissolving drum 12 in a view from its face. Driving motor 19' is schematically depicted. In fact, it is noted that the depictions of FIGS. 2 and 3 are merely schematic and are not intended to provide any constructive details.

Figure 4:
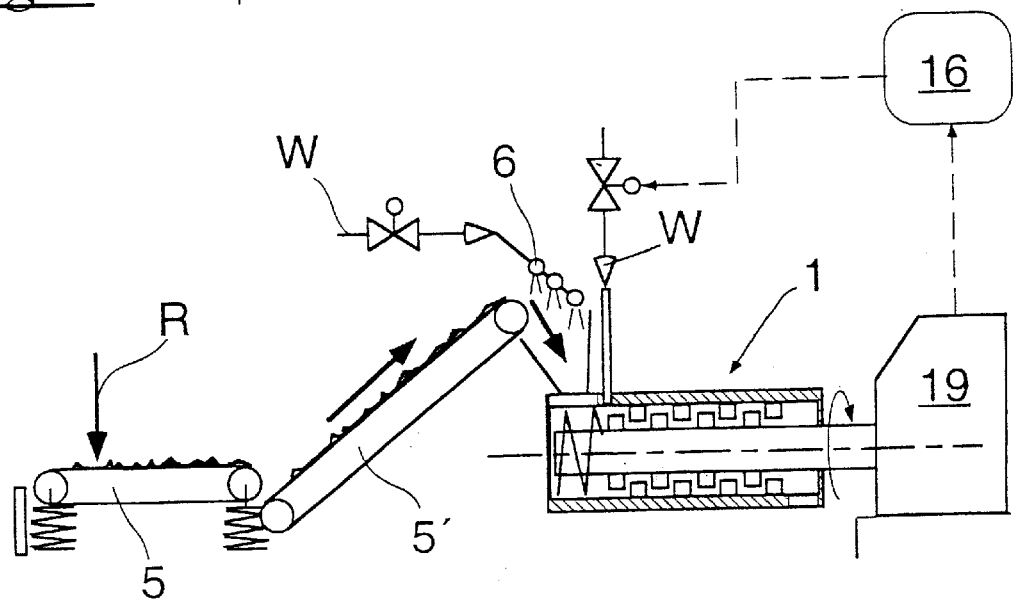
FIG. 4 illustrates a control engineering variant for kneading.

In FIG. 4, another regulating arrangement for kneader 1 is shown. Here, the power consumption of driving motor 19 is determined and is processed in regulator 16 into a setting signal for the dosing of water W. This regulation can also be connected to the arrangement depicted in FIG. 1. The measured power consumption of driving motor 19 also allows the regulation of the specific work in kneading, taking into account the amount of used paper determined. Naturally, driving motor 19, which is coupled to single-wall shredder 1, can also drive a dissolving drum as depicted in FIG. 2 or 3.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent strictures, methods and uses, such as are within the scope of the appended claims.

What is claimed:

1. A process for dissolving used paper, which includes non-fibrous contaminants, comprising:

adjusting a content of solid particles of used paper to a range between about 15 and 35%;

kneading the used paper within the about 15 to 35% solid particles content range with a specific work of at least about 10 kWh/t;

diluting the kneaded used paper to a content of solid particles below about 6%;

separating non-fibrous contaminants with wet screening;

adjusting a solid material content to less than about 3%; and separating particles according to their mass with at least one hydrocyclone.

2. The process in accordance with claim 1, wherein the content of solid particles of used paper is adjusted by introducing water, wherein the non-fibrous contaminants include plastic films, and wherein the solid material content is adjusted to less than about 2%.

3. The process in accordance with claim 1, wherein the wet screening is performed at a consistency of between about 2 and 5%.

4. The process in accordance with claim 1, wherein the wet screening is performed in a wet screener with round screen openings having a diameter of about 1–3 mm.

5. The process in accordance with claim 4, wherein the wet screener removes at least about 80% of the non-fibrous contaminants contained in the used paper during kneading.

6. The process in accordance with claim 5, wherein the non-fibrous contaminants include plastic film.

7. The process in accordance with claim 1, wherein the wet screening is performed in at least one pressure sorter.

8. The process in accordance with claim 1, wherein a temperature of the used paper during kneading exceeds 80° C.

9. The process in accordance with claim 1, wherein the content of solid particles of used paper before kneading is adjusted by being sprayed with water.

10. The process in accordance with claim 1, wherein kneading occurs in a single-wall shredder.

11. The process in accordance with claim 10, wherein the single-wall shredder includes kneading tools moved relative to one another at a speed of no greater than about 15 m/sec and at a distance from one another of at least about 10 mm.

12. The process in accordance with claim 1, wherein the kneading occurs in a double-wall shredder.

13. The process in accordance with claim 12, wherein the kneading is performed for at least about 2 minutes.

14. The process in accordance with claim 1, wherein the kneading is performed in a disk disperser having rows of teeth that engage one another.

15. The process in accordance with claim 1, wherein the kneading is performed in a rotating drum including at least one moving grinding element.

16. The process in accordance with claim 15, wherein a radial extension of the grinding element is at least about 10% of a diameter of the rotating drum.

17. The process in accordance with claim 1, wherein the kneading is performed in a rotating drum including a fixed displacer that forms a kneading zone between the fixed displacer and the rotating drum.

18. The process in accordance with claim 1, wherein the kneading is performed continuously.

19. The process in accordance with claim 18, further comprising adjusting and regulating an intensity of the kneading according to at least one quality value of the used paper determined after kneading.

20. The process in accordance with claim 19, wherein the at least one quality value includes whiteness achieved in a subsequent deinking.

21. The process in accordance with claim 1, further comprising breaking up the used paper that is not suspended up before kneading to such an extent that a majority of the webs or sheets have been torn up several times.

22. The process in accordance with claim 21, further comprising removing coarse impurities from the used paper before kneading.

23. The process in accordance with claim 22, wherein the coarse impurities include coarse heavy portions.

24. The process in accordance with claim 22, further comprising removing iron pieces before kneading with a magnetic separator.

25. The process in accordance with claim 22, further comprising removing bale binding wires before kneading.

26. The process in accordance with claim 1, further comprising removing heavy particles from the suspension with cleaners whose field of force is more than 500 times the acceleration due to gravity.

27. The process in accordance with claim 1, further comprising removing, in a deinking arrangement, fine impurities from the kneaded and suspended used paper.

28. The process in accordance with claim 27, wherein the fine impurities include printing inks.

29. The process in accordance with claim 28, wherein the deinking arrangement is connected downstream of the hydrocyclones.

30. The process in accordance with claim 1, wherein no pulper is used.

31. The process in accordance with claim 1, wherein no dissolving drum with a pure falling effect is used.

32. The process in accordance with claim 1, wherein no sorting is performed at consistencies less than about 2%.

33. The process in accordance with claim 1, wherein no hydrocyclones are used at consistencies greater than about 2%.

34. The process in accordance with claim 1, wherein the process is performed continuously.

35. The process in accordance with claim 1, wherein the amount of water added is adjusted in accordance with an amount of used paper to be dissolved.

36. The process in accordance with claim 1, wherein the amount of water added is adjusted in accordance with a power consumption for kneading, thereby regulating the power consumption.

37. The process in accordance with claim 1, wherein the amount of water added is adjusted to a power consumption for kneading and to an amount of used paper, thereby regulating the specific work of the kneading.

38. A process for dissolving used paper comprising:

kneading used paper having a solid particle content of between about 15 and 35% with a specific work of at least about 10 kWh/t;

diluting the kneaded used paper to a content of solid particles below about 6%;

separating non-fibrous contaminants in the diluted kneaded used paper with wet screening;

adjusting a solid material content of the wet screened used paper to less than about 3%; and separating heavy particles from the wet screened used paper after the solid material content has been adjusted with at least one hydrocyclone.

* * * * *